(12) United States Patent
Massard et al.

(10) Patent No.: US 10,620,428 B1
(45) Date of Patent: Apr. 14, 2020

(54) METHOD FOR MANUFACTURING AN ELECTROWETTING DEVICE USING A HARDENED FLUID COATING

(71) Applicant: Amazon Technologies, Inc., Seattle, WA (US)

(72) Inventors: Romaric Mathieu Massard, Eindhoven (NL); Lucia Marra, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 803 days.

(21) Appl. No.: 14/868,151

(22) Filed: Sep. 28, 2015

(51) Int. Cl.
| | | |
|---|---|---|
| G02B 1/14 | (2015.01) | |
| B01J 13/14 | (2006.01) | |
| G02B 1/12 | (2006.01) | |
| G09G 3/20 | (2006.01) | |
| G02B 26/00 | (2006.01) | |
| G09G 3/34 | (2006.01) | |

(52) U.S. Cl.
CPC ............ *G02B 26/005* (2013.01); *B01J 13/14* (2013.01); *G02B 1/12* (2013.01); *G02B 1/14* (2015.01); *G02B 26/007* (2013.01); *G09G 3/2003* (2013.01); *G09G 3/348* (2013.01)

(58) Field of Classification Search
None
See application file for complete search history.

(56) References Cited

U.S. PATENT DOCUMENTS

| | | | | |
|---|---|---|---|---|
| 5,518,856 | A | * | 5/1996 | Tsuda .................. G03F 7/002 252/600 |
| 2011/0195258 | A1 | | 8/2011 | Fan et al. |
| 2016/0375413 | A1 | * | 12/2016 | Weitz .................. B01F 3/0807 428/402.21 |

OTHER PUBLICATIONS

Luo, R. and Chen, C. (Dec. 31, 2012) "Structured Microgels through Microfluidic Assembly and Their Biomedical Applications". Soft, 1, 1-23 Scientific Research http://www.scirp.org/journal/soft/.

Charlot, B., Sanchez, N., Roux, P., Teixiera, S., "Double emulsion generation and separation by microfluidic consecutive flow focusing", DTIP, Symposium on Design, Test, Integration and Packaging of MEMS/MOEMS, at Cannes, France, Apr. 1-4, 2014.

* cited by examiner

*Primary Examiner* — Jeffrey D Washville
(74) *Attorney, Agent, or Firm* — EIP US LLP

(57) ABSTRACT

A method of manufacturing an electrowetting element. A first fluid is dispensed. A second fluid immiscible with the first fluid is dispensed. A fluid coating around the first fluid and the second fluid is dispensed. The fluid coating is hardened to form a capsule containing the first and the second fluid.

23 Claims, 9 Drawing Sheets

METHOD FOR MANUFACTURING AN ELECTROWETTING DEVICE USING A HARDENED FLUID COATING

BACKGROUND

A known method of manufacturing an electrowetting device involves providing a layer of a photoresist on a support plate. The photoresist is patterned using photolithography to form walls on the support plate. Subsequently, a first fluid and a second fluid immiscible with the first fluid are applied to the support plate.

It is desirable to provide an alternative method of manufacture of an electrowetting device.

DETAILED DESCRIPTION

Figure 1:
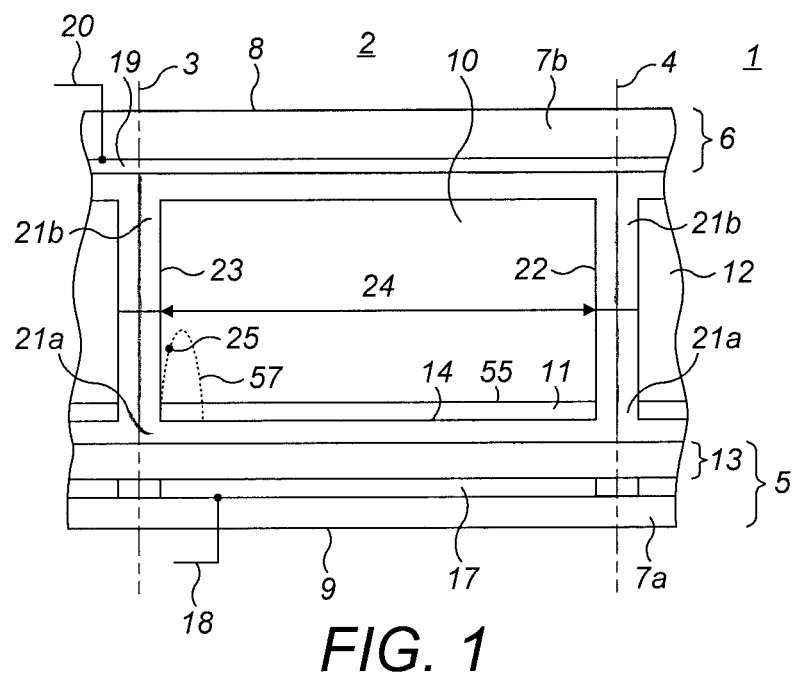
FIG. 1 shows schematically an electrowetting element according to examples.

FIG. 1 shows a diagrammatic cross-section of part of an electrowetting display device 1 according to examples, including a plurality of picture elements or display elements 2, one of which is shown in the Figure and which may also be referred to as an electrowetting pixel. Such a pixel or display element is an example of an electrowetting cell or an electrowetting element, the pixel or display element being an example of an electrowetting element for providing a display effect. In examples, the electrowetting element may be used as a lens. The lateral extent of the display element is indicated in the Figure by two dashed lines 3, 4. The display elements comprise a first support plate 5 and a second support plate 6. The support plates may be separate parts of each display element, but alternatively the support plates may be shared in common by the plurality of display elements. The support plates may include a glass, polymer or composite substrate 7a, 7b and may be rigid or flexible. The support plates in some examples include further layers and/or structures than illustrated, for example circuitry for controlling the display elements. Such features are not illustrated, for clarity.

The display device has a viewing side 8 on which an image or display formed by the display device can be viewed and a rear side 9. In the Figure a surface of the first support plate 5, which surface is in this example a surface of the substrate 7a, defines the rear side 9; a surface of the second support plate 6, which surface is in this example a surface of the substrate 7b, defines the viewing side 8; alternatively, in other examples, a surface of the first support plate may define the viewing side. The display device may be of the reflective, transmissive or transflective type. The display device may be an active matrix driven or a direct drive display device. The plurality of display elements may be monochrome. For a colour display device the display elements may be divided in groups, each group having a different colour; alternatively, an individual display element may be able to show different colours.

In examples such as that of FIG. 1, a capsule 21 is between the first support plate 5 and the second support plate 6. The capsule may be considered to be solid such that, in examples, it has a shape which, without energy input, maintains its shape and does not flow in the manner of a liquid, which liquid would flow to adopt a shape of at least part of its container, and which does not expand in the manner of a gas to freely fill any space available irrespective of its quantity. For example a solid is stable in shape and is not fluid in nature. For example, a solid is not a liquid or a gas. A solid may have some degree of flexibility in shape though. For example, a gel is a type of solid that can be easily deformed when pressure is applied to it yet which retains its shape otherwise. Further, for example, a solid material may possess an inherent elasticity or flexibility, or in other examples may be rigid. It is noted that the nature of the capsule may be considered solid at temperatures at which an electrowetting display device may normally be used, for example between −10 degrees Celsius and 40 degrees Celsius. A rigid solid may be sufficiently rigid to provide structural strength to the display device, or in other examples may be sufficiently flexible such that when compressed between the first and second support plates the capsules provide structural strength to the display device. Hence, hardening referred to herein may be sufficient to form a capsule, for example a sufficiently solid capsule as required for manufacture of an electrowetting device.

A capsule typically is a container, shell, or encapsulating body, for example, which surrounds a core region. In examples the core region is filled with, for example contains, the first fluid and the second fluid.

In the examples described with respect to FIG. 1, the capsule may be considered to be a solid capsule. In examples such as the example of FIG. 1, the capsule 21 has a cuboid shape. In other examples, the capsule may have other shapes, for example cuboid with rounded edges or egg-shaped or approximately spherical or spherical. For example, each capsule may have any shape which can be tessellated with other capsules to form an array, for example a matrix, of capsules within the electrowetting device. The capsule may have bottom and top sides with at least a part which is substantially flat, for example flat or planar within acceptable variations, for contacting the first support plate 5 and second support plate 6 respectively.

In examples such as that of FIG. 1, the capsule 21 has a first side 21a and a second side 21b. The first side 21a comprises for example an electrically non-conductive material such as a cross-linkable fluoropolymer, for example Teflon AF1600® or CYTOP® (available from Asahi Glass Co. Ltd., 1-5-1 Marunouchi, Chiyoda-ku, Tokyo 100-8405, Japan). The second side 21b for example comprises an electrically conductive material, for example an electrically conductive photoresist, which for example may include electrically conductive nanoparticles such as gold or silver particles or carbon nanotubes. For example, the electrically conductive material may comprise a photoresist, for example a negative photoresist such as SU-8, and one or more of: silver nanoparticles, hydrochloric acid (HCl) doped polyaniline or multi-walled carbon nanotubes. The first side 21a and the second side 21b are each regions, volumes or parts of the capsule for example. In examples such as that of FIG. 1, the first and second sides 21a, 21b each form approximately half, or half, of in different examples different proportions of the capsule 21, with the first side 21a facing, for example opposing, the second side 21b such that when combined the two sides together form the capsule. In other examples, the capsule may comprise sides other than the first and second sides and/or the first and second sides may not face each other; they may be adjacent or neighbouring for example. In the examples described in relation to FIG. 1, the first and second sides 21a, 21b are respectively formed of electrically non-conductive material and electrically conductive material. However, in other examples, the first and second sides 21a, 21b may include other material(s) as well may each be solely formed of the electrically non-conductive and electrically conductive material respectively. In examples the sides of adjacent capsules may be considered to form walls between the adjacent capsules, for example walls between adjacent electrowetting elements, to separate the first and second fluids of one electrowetting element from the first and second fluids of a different, adjacent, electrowetting element.

In examples such as that of FIG. 1, the capsule 21 contains a first fluid 11 and a second fluid 12, at least one of which may be a liquid. The second fluid is immiscible with the first fluid which for example means the first and second fluids are immiscible with each other. Therefore, the first fluid and the second fluid do not substantially mix with each other and in some examples do not mix with each other to any degree. With the first and second fluids substantially not mixing with each other, it is envisaged in some examples that there may be some degree of mixing of the first and second fluids, but that this is considered negligible in that the majority of the volume of the first fluid is not mixed with the majority of the volume of the second fluid. The substantial immiscibility of the first and second fluids is due to the properties of the first and second fluids, for example their chemical compositions; the first and second fluids tend to remain separated from each other, therefore tending not to mix together to form a homogeneous mixture. Due to this immiscibility, the first and second fluids meet each other at an interface labelled 55 in FIG. 1 for when no voltage is applied and labelled 57 for when a voltage is applied, which interface defines a boundary between the volume of the first fluid and the volume of the second fluid; this interface or boundary may be referred to as a meniscus. The location and shape of the interface between the first fluid and the second fluid in examples is determined by the applied voltage. The thickness of the first and second fluids in FIG. 1 is shown as an example; in other examples, the first and/or second fluids may have different thicknesses.

The second fluid of the device is at least one of electrically conductive or polar, i.e. the second fluid is electrically conductive, polar, or both, and may comprise water, and/or a salt solution such as a solution of potassium chloride in water. The second fluid may be transparent; it may instead be coloured, for example, or absorbing. The first fluid of the device, which is electrically non-conductive, may for example include an alkane like decane ($CH_3(CH_2)_8CH_3$) or hexadecane ($CH_3(CH_2)_4CH_3$), a silicone oil like for example hexamethyldisiloxane $O—(Si(CH_3)_3)_2$, or decalin (otherwise known as bicyclo-4,4,0-decane).

Electrically conductive typically means that the second fluid is capable of conducting electricity; for example an electrical current may flow through the second fluid due to the flow of ions through the second fluid. A polar second fluid generally comprises at least one compound (for example a liquid vehicle) having a molecule with a net dipole. For example, across the molecular structure the molecule may have an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bond in the molecule, with for example one of the atoms being a heteroatom such as oxygen or nitrogen. For example, such a polar atom to atom bond is a bond between an oxygen (O) atom and a hydrogen (H) atom, i.e. an —O—H bond, which may be in some examples due to the presence of at least one hydroxyl (—OH) group. The presence of such bonds may cause hydrogen bonding between different molecules within the second fluid.

In examples, the second fluid comprises at least one of water, a polyether; a peroxide; a polyol such as a diol, a triol and/or a tetraol; an ether; dioxalane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; and/or glutaric acid; a tricarboxylic acid; citric acid; aconitic acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; polyethylene glycol; propylene glycol; erythritol; ethylene glycol; glycerol; butanetriol; derivatives thereof; or combinations thereof. A heteroatom in examples is for example nitrogen (N), sulphur (S), boron (B) or phosphorus (P) or a halogen atom such as chlorine (Cl), fluorine (F), bromine (Br) or iodine (I).

The first fluid may absorb at least a part of the visible spectrum. The first fluid may be transmissive for a part of the visible spectrum, forming a colour filter. For this purpose the first fluid may be coloured by addition of pigment particles or a dye. Alternatively, the first fluid may be black, for example absorb substantially all parts of the visible spectrum, or reflecting. A reflective first fluid may reflect the entire visible spectrum, making the layer appear white, or part of it, making it have a colour. In examples, the first fluid is black and therefore absorbs substantially all parts of the optical spectrum, for example in the visible light spectrum. Typically, substantially all parts of the optical spectrum may include a degree of variation, therefore the first fluid may not absorb all wavelengths, but the majority of wavelengths within a given spectrum such as the visible spectrum, so as to perform the function of the first fluid in the element. The first fluid may therefore be configured to absorb substantially all light incident on the first fluid. For example the first fluid may absorb 90% or more of light in the visible spectrum and incident on the first fluid.

The first support plate 5 includes an insulating layer 13. The insulating layer may be transparent, for example fully transparent, for example transmissive at least to visible light. The insulating layer 13 may extend so it is aligned with, for example such that it is beneath and overlapped by, capsules 21 of a display element. In the examples described with respect to FIG. 1, the first side 21a of the capsule is between the first support plate 5 and the first fluid 11 and the second side 21b of the capsule is between the second support plate 6 and the second fluid 12, with the first and second sides 21a, 21b respectively contacting the first and second support plates 5, 6. Thus, in these examples, the first side 21a of the capsule is in contact with, for example touching, the insulating layer 13 of the first support plate 13. In other examples there may be one or more further layers than shown between either of the first and second sides and the first and second support plates respectively.

To avoid short circuits between the capsule 21 and electrodes arranged under the insulating layer, layers of the insulating layer may extend uninterrupted over a plurality of display elements 2, as shown in the Figure. The thickness of the insulating layer may be less than 2 micrometers and may be less than 1 micrometer; for example the insulating layer may be 400 nanometres or less in thickness.

The insulating layer may function as or further comprise a barrier layer (not shown) with predetermined dielectric properties. The barrier layer may have a thickness, taken in a direction perpendicular to the plane of the substrate, of between 50 nanometers and 500 nanometers and may be made of an inorganic material like silicon oxide or silicon nitride.

In examples such as that of FIG. 1, the first side 21a of the solid capsule comprises a material more wettable to the first fluid 11 than to the second fluid. For example, the material of the first side 21a of the capsule may have a greater wettability for the first fluid than for the second fluid; an inner surface 14 of the first side 21a of the capsule may therefore be hydrophobic. Therefore, in the absence of an applied voltage, for example with the applied voltage being a zero voltage, the first fluid adheres preferentially to the inner surface 14 of the first side 21a of the capsule. As will be explained, with the applied voltage being a non-zero voltage or a driving voltage, the inner surface 14 of such examples has a higher wettability for the second fluid than for the first fluid; for example the inner surface with the applied non-zero voltage may be considered to be hydrophilic. Wettability relates to the relative affinity of a fluid for the surface of a solid. Wettability may be measured by the contact angle between a boundary of the fluid and the surface of the solid. The contact angle is determined by the difference in surface tension between the fluid and the solid at the fluid-solid boundary. For example, a high difference in surface tension can indicate hydrophobic properties. As the skilled person will appreciate, a material may be considered to be hydrophobic if the contact angle with water is greater than 90 degrees; a material may therefore be considered to be hydrophilic if the contact angle with water is less than 90 degrees.

The inner surface of the capsule in examples may be shaped for example by the shape of the outer surface of at least one of the first or second fluids during the manufacture process. In other examples, the shape of the inner surface may be influenced by deformation of the capsule with for example pressure before hardening of the fluid coating, or in other examples perhaps using pressure applied to the capsule after hardening.

In examples such as that of FIG. 1, each display element 2 includes a first electrode 17 as part of the first support plate 5. In examples shown there is one such first electrode 17 per element; in other examples there may be more than one first electrode per display element. The first electrode 17 is electrically insulated from the first and second fluids by the insulating layer 13; electrodes of neighbouring display elements are separated by a non-conducting layer, although in other examples electrodes of one or more neighbouring display elements may be electrically connected. In some examples, further layers may be arranged between the insulating layer 13 and the first electrode 17. The first electrode 17 can be of any desired shape or form. The first electrode 17 of a display element is supplied with voltage signals by a signal line 18, schematically indicated in the Figure.

The second support plate 6 for example includes a second electrode 19, which may extend between sides of a display element, and/or be disposed, for example located, above and/or covering or overlapping the sides of the display element and/or extend uninterruptedly over a plurality of display elements 2, as shown in the Figure. The second electrode 19 is in electrical contact with the capsule 21 and is common to all display elements. In the examples described in relation to FIG. 1, the second side 21b of the capsule is in electrical contact with the second electrode 19 and the second fluid 12. In these examples, this is because the second side 21b of the capsule contacts both the second electrode 19 and the second fluid 12. In other examples, the second side 21b of the capsule may not contact the second electrode 19 and/or the second fluid 12. For example, one or more further electrodes may be used to electrically connect the second side 21b of the capsule to the second electrode 19 and/or the second fluid. The first and second electrodes 17, 19 may be made of for example the transparent conductive material indium tin oxide (ITO). A second signal line 20 is connected to the second electrode 19. The second electrode 19 may be common to all elements or individual elements may have their own second electrodes 19. The display element 2 can be controlled by a voltage V applied between the signal lines 18 and 20. The signal line 18 can be coupled to a matrix of control lines on the substrate 7a. The signal lines 18 and 20 are coupled to a display driving system.

The extent of the display element, indicated by the dashed lines 3 and 4, is in this example defined by lateral sides of the outer surface of the capsule 21. The area of the inner surface 14 adjoined by the first fluid 11 in the absence of an applied voltage, indicated by the dashed lines 22 and 23, is called the display area 24, over which a display effect occurs. As explained above, an extent of the inner surface 14 corresponding to the extent of the display area is in this example hydrophobic. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. Thus, a configuration of the first fluid 11 and the second fluid 12 is switchable using a voltage applied between the first electrode 17 and the second electrode 19, with the display effect depending on the configuration of the first and second fluids in the display element. The display effect gives rise to a display state of the display element for an observer looking at the display device. When switching the electrowetting element from one fluid configuration to a different fluid configuration the extent of the second fluid adjoining the display area surface may increase or decrease, with the extent of the first fluid adjoining the display area surface decreasing or increasing, respectively.

In examples a sealing element (not shown) is arranged on the first support plate 5 which define the lateral extent, for example a periphery, of the electrowetting device 1. The sealing element may be used to seal the first support plate 5 to the second support plate 6. In examples, the sealing element seals a perimeter of the electrowetting device 1 and therefore may be formed as a rectangular or square shaped seal for example for surrounding a matrix of display elements of the electrowetting device 1 being manufactured. Therefore, the sealing element may be provided on the first support plate 5 with a suitable shape and of sufficient thickness for coupling the first support plate 5 to the second support plate 6. The sealing element may be hydrophilic to aid sealing of the electrowetting device 1. In other examples, the sealing element may be omitted.

Figure 2:
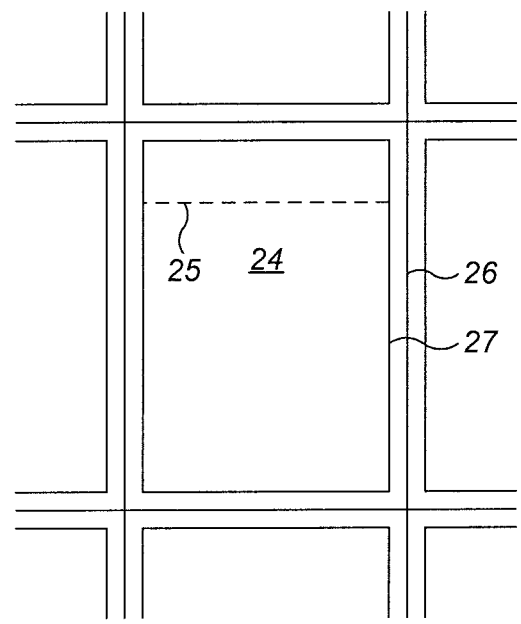
FIG. 2 shows schematically a plan view of the electrowetting element of FIG. 1 according to examples.

FIG. 2 shows a matrix of rectangular picture elements in a plan view of the hydrophobic surface of the first support plate. The extent of the central picture element in FIG. 2, corresponding to the dashed lines 3 and 4 in FIG. 1, is indicated by the dashed line 26. Line 27 indicates the inner border of a capsule; the line 27 is also the edge of the display area 24.

When a zero or substantially zero voltage is applied between the first and second electrodes 17 and 19, for example when the electrowetting element is in an off state, the first fluid 11 forms a layer between the sides 21*a*, 21*b*, as shown in FIG. 1. Application of a voltage will contract the first fluid, for example against a side of the capsule as shown by the dashed shape 25 in FIG. 1 or FIG. 2. The controllable shape of the first fluid, in dependence on the magnitude of applied voltage, is used to operate the picture element as a light valve, providing a display effect over the display area 24. For example, switching the first and second fluids to increase adjoinment of the second fluid with the display area may increase the brightness of the display effect provided by the element. This display effect determines the display state an observer will see when looking towards the viewing side of the display device. The display state can be from black to white with any intermediate grey state; in a colour display device, the display state may also include colour.

Examples of at least part of a method of manufacture of an electrowetting device will now be described. Specifically, these examples describe manufacture of an electrowetting display device in accordance with FIGS. 1 and 2. It is to be appreciated though that the method may also be used to manufacture other examples of electrowetting devices different from those specifically described with FIGS. 1 and 2.

Figure 3:
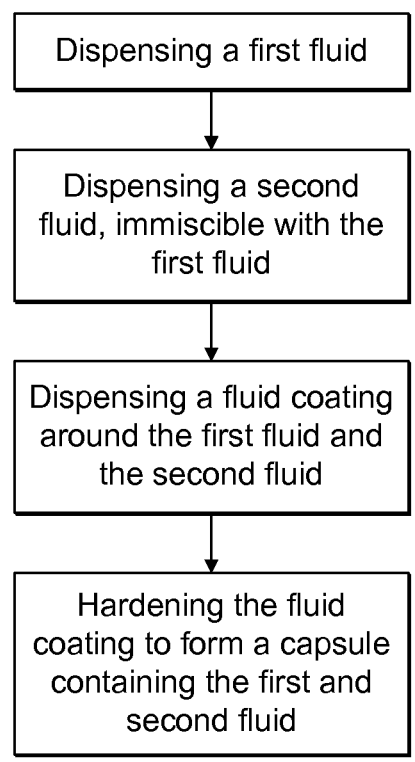
FIG. 3 is a flow diagram relating to examples of a method of manufacturing an electrowetting device.

FIG. 3 shows a flow diagram of part of a method of manufacturing an electrowetting device according to examples described herein. The example methods of FIG. 3 include dispensing a first fluid, dispensing a second fluid immiscible with the first fluid and dispensing a fluid coating around the first fluid and the second fluid. Methods in accordance with FIG. 3 further include hardening the fluid coating to form a capsule containing the first and the second fluid.

Part of a method of manufacturing an electrowetting device, for example an electrowetting display device, according to examples is shown schematically in FIGS. 4*a* to 4*f*. This method is an example of the examples of FIG. 3, though it is to be appreciated that further examples may be envisaged which accord with FIG. 3 but which have some features in common with and/or are different from those described using FIGS. 4*a* to 4*f*, as the skilled person will understand. The examples described with respect to FIGS. 4*a* to 4*f* show part of an example method for manufacturing the electrowetting device 1 of FIGS. 1 and 2; features of the electrowetting device 1 of FIGS. 1 and 2 shown in FIGS. 4*a* to 4*f* are labelled using the same reference numerals and corresponding descriptions should be taken to apply. As described above with reference to FIG. 3, the methods described with reference to FIGS. 4*a* to 4*f* can also be used to manufacture electrowetting devices different from that of FIGS. 1 and 2.

Example methods such as that of FIGS. 4*a* to 4*f* use what may be referred to as a microfluidic technique or process. This process manipulates the movement of fluids, for example as streams or flows, to coat the first fluid and the second fluid with the fluid coating and then to produce the capsule and, in examples, to manoeuvre it into place on the first support plate 5. The direction of fluid flow is illustrated schematically in FIGS. 4*a* to 4*f* using arrows. As can be seen in FIGS. 4*a* to 4*f*, the fluids may move either as a continuous flow or stream; or as a discontinuous flow or stream of discrete portions of fluid, for example as a discontinuous sequence of separate droplets of fluid.

In example methods such as that of FIGS. 4*a* to 4*f*, the first fluid is dispensed into the second fluid to form at least one of an emulsion of the first fluid dispersed in the second fluid, or a droplet of the first fluid within the second fluid. In FIGS. 4*a* to 4*f*, a stream of the first fluid 11 is dispensed into a stream of the second fluid 12 thereby dispersing the first fluid 11 into the second fluid 12 to form a droplet of the first fluid within the second fluid. In this example, a stream of the first fluid 11 is released from a first inlet 30 and a stream of the second fluid 12 is released from a second inlet 32. The first and second fluids 11, 12 flow in first and second channels 34, 36 respectively, which are for example passageways, such as those formed by a tube, pipe or other conduit. The stream of the first fluid 11 is dispensed into the moving second fluid 12 via the first channel 34. Where the stream of the first fluid 11 meets the stream of the second fluid 12, the first fluid 11 is dispersed into the second fluid 12. For example, prior to meeting the stream of the second fluid 12, the first fluid 11 may be in the form of a continuous flow. Upon meeting the stream of the second fluid 12, the first fluid 11 may break up into a series of discrete droplets dispersed in the second fluid 12. In examples, this occurs due to a pressure gradient applied to the stream of the first fluid 11, which applies a shear force sufficient to disperse droplets of the first fluid 11 in the second fluid 12. The series of droplets of the first fluid 11 may be considered a discontinuous series or sequence, for example a discontinuous stream, for example with approximately uniform sizes, for example uniform within acceptable measuring variations, of first fluid 11 droplets with approximately uniform spacings, for example uniform within acceptable measuring tolerances, in between neighbouring droplets. In other examples, there may be uneven gaps in distance between subsequent droplets of the first fluid 11. A droplet of the first fluid 11 is typically an approximately spherical, for example spherical, quantity of fluid although other shapes are possible, for example pendant- or egg-shaped. Where the first fluid 11 and the second fluid 12 form an emulsion, the first fluid 11 is the dispersed phase and the second fluid 12 is the continuous phase in examples.

Figure 4A:
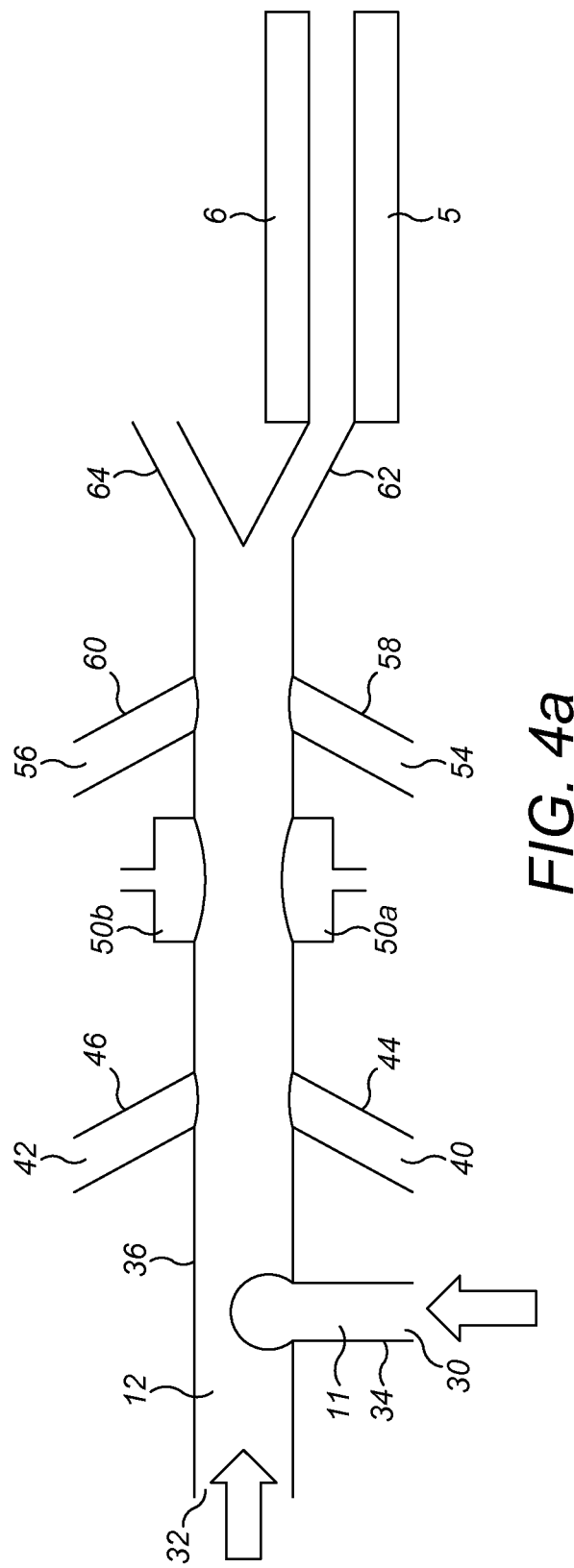
FIGS. 4a to 4f show schematically part of a method of manufacturing an electrowetting device according to examples.

In examples such as that of FIG. 4*a*, the first channel 34 is approximately perpendicular to the second channel 36. In other examples, there may be a different angular separation between the first and second channels 34, 36. For example, the first and second channels 34, 36 may be configured such that the first and second fluids 11, 12 flow towards each other but with an angular separation which is between 20 degrees of the perpendicular.

Figure 4B:
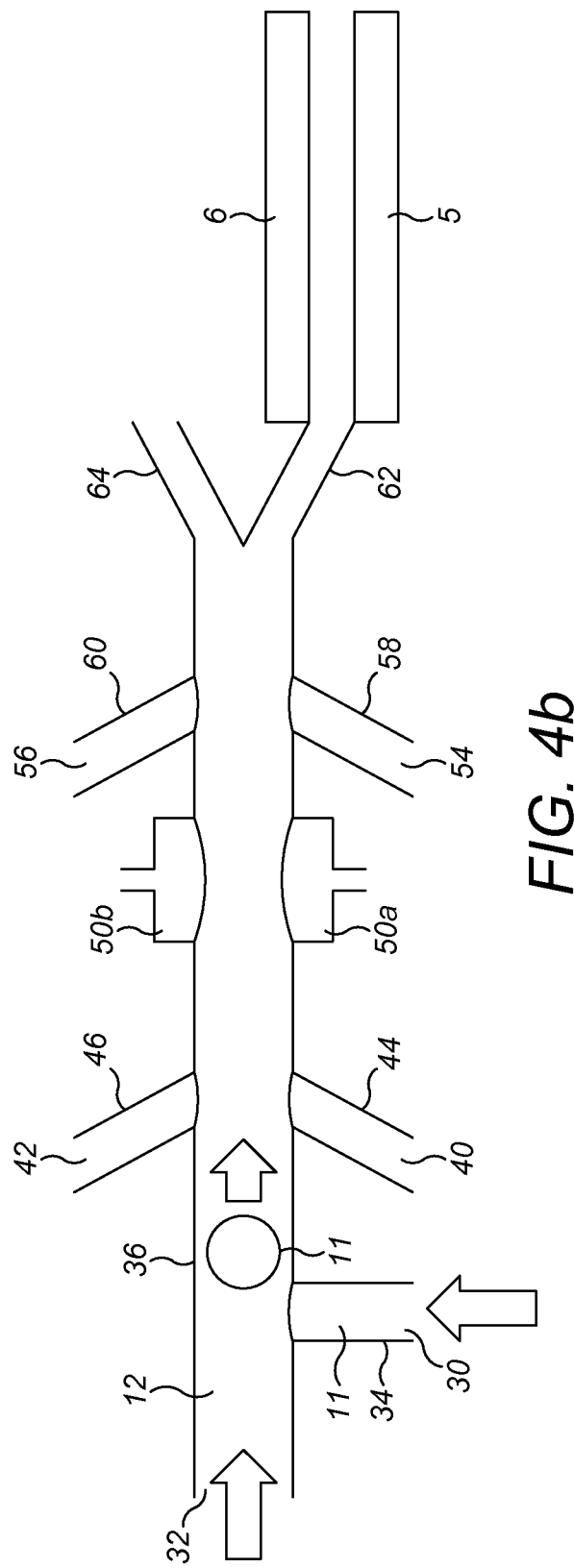

As can be seen in FIG. 4*b*, in examples the second fluid 12 is supplied continuously, forming a continuous stream. In such examples, the flow of the second fluid 12 moves the first fluid 11 dispersed within the second fluid 12 through the second channel 36, towards further components of the apparatus for performing the microfluidic process.

Example methods may involve dispensing a first stream of the fluid coating in a first direction and dispensing a second stream of the fluid coating in a second direction towards the first stream of the first fluid and substantially opposing the first direction. Such examples may further include dispensing a stream of the first fluid into a stream of the second fluid to disperse the first fluid in the second fluid, for example as described above with reference to FIG. 4a, and dispensing a stream of the second fluid, with the first fluid dispersed in the second fluid, into a region of the fluid coating where the first stream of the fluid coating meets the second stream of the fluid coating. In examples, the stream of the second fluid, with the first fluid dispensed in the second fluid, is dispensed in a direction substantially perpendicular to the first direction and the second direction, although other directions are possible. Such an example is illustrated schematically in FIG. 4c.

Figure 4C:
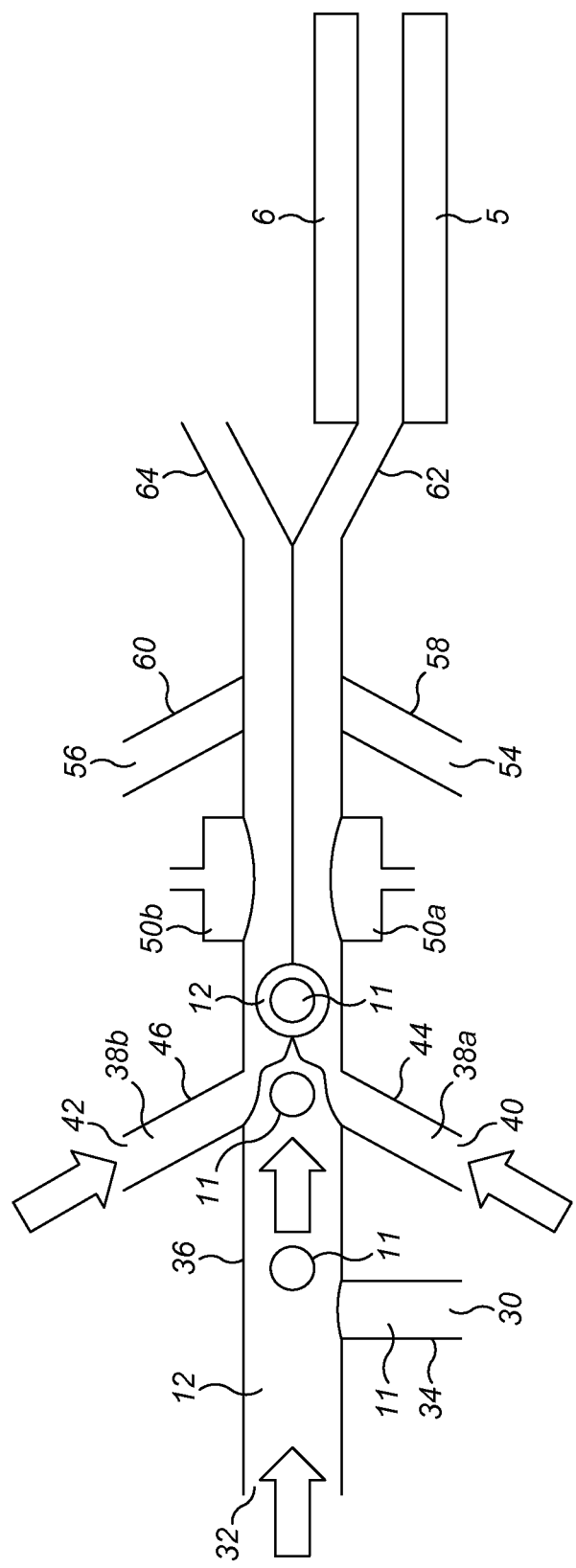

In FIG. 4c, first and second streams 38a, 38b of a coating fluid, for providing the fluid coating, are dispensed via third and fourth inlets 40, 42 into third and fourth channels 44, 46. The coating fluid is described in further detail below. The first and second streams 38a, 38b of the coating fluid flow towards each other and towards the stream of the second fluid 12 with the first fluid 11 dispersed in it. The stream of the second fluid 12 including the dispersed first fluid 11 is between the first and second streams 38a, 38b of the coating fluid; for example, the first and second streams 38a, 38b of the coating fluid are on opposing sides of the stream of the second fluid 12, with each of the first and second streams 38a, 38b of the coating fluid flowing in opposing directions towards the stream of the second fluid 12. For example, an angular separation between the first and second streams 38a, 38b of the coating fluid is roughly 160 degrees, although in other examples the angular separation may be around 180 degrees plus or minus 45 degrees for the first and second streams 38a, 38b to substantially oppose each other. As will be appreciated, with the first and second streams 38a, 38b of the coating fluid substantially opposing each other, the first and second streams 38a, 38b flow approximately towards each other but in directions which differ by between around 180 degrees plus or minus 45 degrees of each other. The stream of the second fluid 12 with the first fluid 11 dispersed in it is substantially perpendicular to the first and second directions of the first and second streams 38a, 38b of the coating fluid respectively such that, for example, an angular separation between the stream of the second fluid 12 and each of the first and second streams 38a, 38b of the coating fluid is roughly 90 degrees plus or minus 20 degrees. In other examples, other angular separation may be used, as the skilled person will appreciate. For example, an angular separation between the stream of the second fluid 12 with the first fluid 11 dispersed in it and a long axis of the dispensing apparatus, for example an axis of the second channel 36, which in examples is a horizontal axis, may be up to around 45 degrees. The relative angles between the streams of the coating fluid and the second fluid with the first fluid dispersed in it may be controlled to adjust the flow rates of the coating fluid and the second fluid with the first fluid dispersed in it respectively to obtain a desired rate of production of the electrowetting element.

Where the first and second streams 38a, 38b of the coating fluid meet the stream of the second fluid 12 with the first fluid 11 dispersed in it, the coating fluid 38 will surround the first and second fluids 11, 12. In examples described with respect to FIG. 4c, for example, the first fluid 11 is in the form of droplets in the second fluid 12. In these examples, the coating fluid may surround a droplet of first fluid 11, trapping a layer of second fluid 12 between the first fluid 11 droplet and the coating fluid 38. For example, the coating fluid 38 may be around the second fluid 12, for example coating, encapsulating or enveloping the second fluid 12. The coating fluid 38 in examples causes the second fluid 12 to itself surround, coat, encapsulate or envelop the droplet of the first fluid 11 such that the second fluid 12 forms a layer separating the coating fluid 38 from contacting the first fluid 11.

Other example methods may include dispensing a first stream of the fluid coating and dispensing a second stream of the fluid coating towards the first stream of the fluid coating, for example as shown in FIG. 4c, dispensing the first fluid between the first stream of the fluid coating and the second stream of the fluid coating and dispensing the second fluid comprising dispensing the second fluid between the first stream of the fluid coating and the second stream of the fluid coating. In such examples, the first fluid and the second fluid may not be in the form of an emulsion. For example, the first fluid and the second fluid may be supplied as two streams, for example two streams which flow alongside each other in the same channel but which do not mix if the first and second fluids are immiscible with each other. With the first fluid and the second fluid supplied in this way, the first stream of the fluid coating may flow towards the first fluid, and the second stream of the fluid coating may flow towards the second fluid such that fluid coating from the first stream meets the first fluid and fluid coating from the second stream meets the second fluid. The fluid coating may then be around, for example to surround or coat, the first and second fluids. However, in such examples, the first and second fluids surrounded by the fluid coating may be in the form of two distinct layers of the first and second fluid, for example if the first and second fluid are substantially immiscible with each other; as described above, there may be a meniscus at a boundary between the layers.

Although in the examples above the fluid coating is dispensed as two streams, the fluid coating may be dispensed as one, or more than two streams in other examples.

As explained above, in examples the method includes hardening the fluid coating to form a capsule containing the first and the second fluid, for example a capsule similar to that described above with reference to FIGS. 1 and 2. Hardening the fluid coating may involve applying electromagnetic radiation, for example with a wavelength of between about 100 to about 380 nanometers to the fluid coating. This may include a degree of variation within the range of 100 to 380 nanometers, for example the wavelength may be within this range within acceptable measurement uncertainties for example within 10% of the upper or lower bound of the range of wavelengths. This range for example corresponds to ultraviolet radiation. For example, applying electromagnetic radiation may cross-link the material of the fluid coating, thus turning it from a liquid to a solid, thereby forming the capsule. Such hardening may in some examples be a curing technique.

Figure 4D:
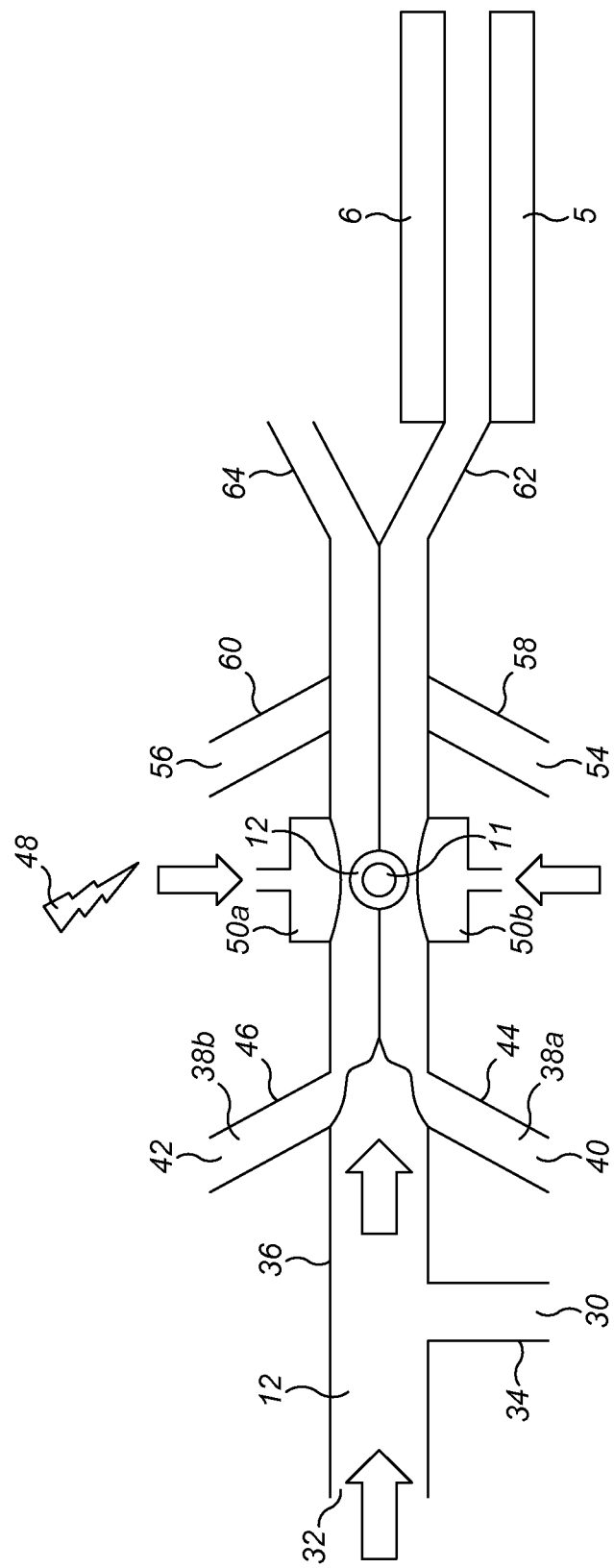

Applying electromagnetic radiation 48 such as this is shown schematically in FIG. 4d, which omits the dispensing of the first fluid 11 for clarity. In examples, the electromagnetic radiation is applied by an electromagnetic radiation source. An electromagnetic radiation source is for example an emitter of electromagnetic radiation, such as ultraviolet radiation with a wavelength of between about 100 to about 380 nanometers. Electromagnetic radiation emitted from the electromagnetic radiation source may be coupled to a light guide, which may otherwise be considered an electromagnetic radiation guide, surrounding a channel through which the fluid coating flows. For example, the light guide may be in the form of a hollow cylinder, which is coaxial with and surrounding the channel through which the fluid coating flows. In examples, this allows the electromagnetic radiation emitted by the electromagnetic radiation source to be uniformly incident on the fluid coating in the channel. For example, the light guide may be configured to propagate a substantially isotropic distribution of electromagnetic radiation towards the fluid coating. In this way, electromagnetic radiation incident on the fluid coating within the cylinder may be applied evenly to the fluid coating so it is hardened in a layer of an approximately uniform thickness to encapsulate the first and second fluids. The electromagnetic radiation may be applied as a pulse, for example tuned to a flow rate of the fluid coating, to harden at least an outer layer of the fluid coating for example by polymerisation of the fluid coating. The pulse may have a relatively high energy and high power, and may be applied for a time of less than around 1 microsecond (µs) in examples.

The method of hardening of the fluid coating may include applying pressure to the fluid coating during the hardening the fluid coating, for example using a pressure applicator. Pressure may be applied while electromagnetic radiation is applied to the fluid coating or at another time, for example before applying electromagnetic radiation. In the example of FIG. 4d, pressure is applied to the fluid coating 38 in the form of air which is directed towards the fluid coating 38 from first and second air dispensers 50a, 50b, which are on opposing sides of the fluid coating 38 and which form a pressure applicator. Air may be supplied from one dispenser or more than two dispensers in other examples. In other examples, a gas other than air or a liquid may be used instead or as well as air. In yet further examples, a different pressure applicator may be used to apply pressure to the fluid coating. For example, the fluid coating may be squeezed or constricted, either directly or indirectly. For example, a membrane or wall, for example a polydimethylsiloxane PDMS membrane may be used to apply pressure to the fluid coating. In such examples, the fluid coating may pass through an inner chamber, for example a cylindrical chamber, with a wall or membrane comprising PDMS. Applying air pressure in an outer chamber or cylinder surrounding the inner chamber will cause the PDMS wall or membrane of the inner chamber to deform, decreasing the volume of the inner chamber and thereby applying pressure to the fluid coating passing through the inner chamber. In examples, a membrane, for example a PDMS membrane, may be used in combination with the application of ultraviolet radiation as described above to obtain capsules with an approximately elliptical or egg shape, with a width smaller than a width of the inner chamber. In other examples, a valve such as a thermal expansion valve or magnetic valve can be used to regulate a pressure applied to the fluid coating.

In examples, applying pressure to the fluid coating thins the fluid coating, allowing a thickness of the capsule formed upon hardening the fluid coating to be accurately controlled. Applying pressure in the form of a gas or liquid in examples removes the fluid coating from the sides of the channel 36 so that the shape of the capsule is more uniform after hardening of the fluid coating. The applied pressure may also flatten one or more sides of the fluid coating, for example so that the capsule has one or more sides which are approximately flat, for example flat within acceptable variations, for example planar. Where such sides are the top and bottom sides of the capsule, which in examples may contact the first and second support plates, flattening the sides in this way can ensure adequate contact between the first and second support plates. Furthermore, by using the pressure to accurately control the shape and size of the capsule, the capsules can be manufactured in a more uniform manner, so that they fit together closely when arranged in an array or matrix between the first and second support plates, for example by tessellation.

The method may include hardening the fluid coating to form a solid capsule. The hardening may be performed as above, for example with the applied electromagnetic radiation and pressure tuned so as to solidify the fluid coating.

Figure 4E:
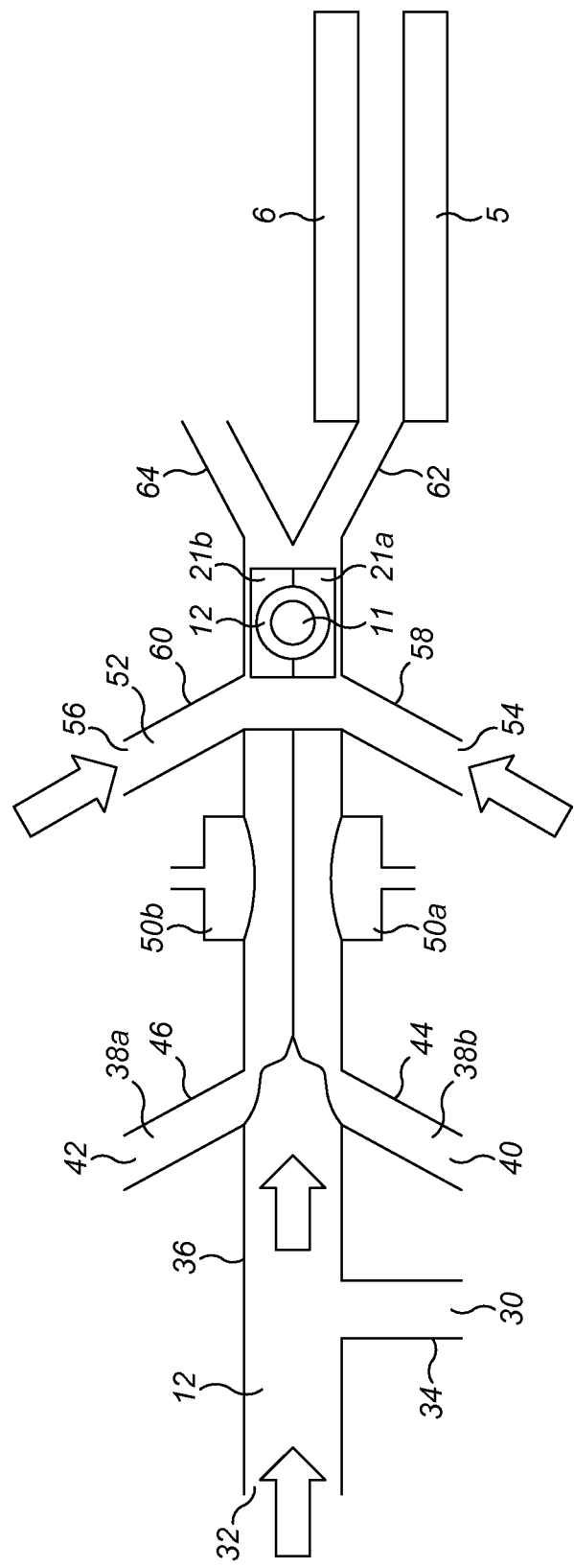
Figure 4F:
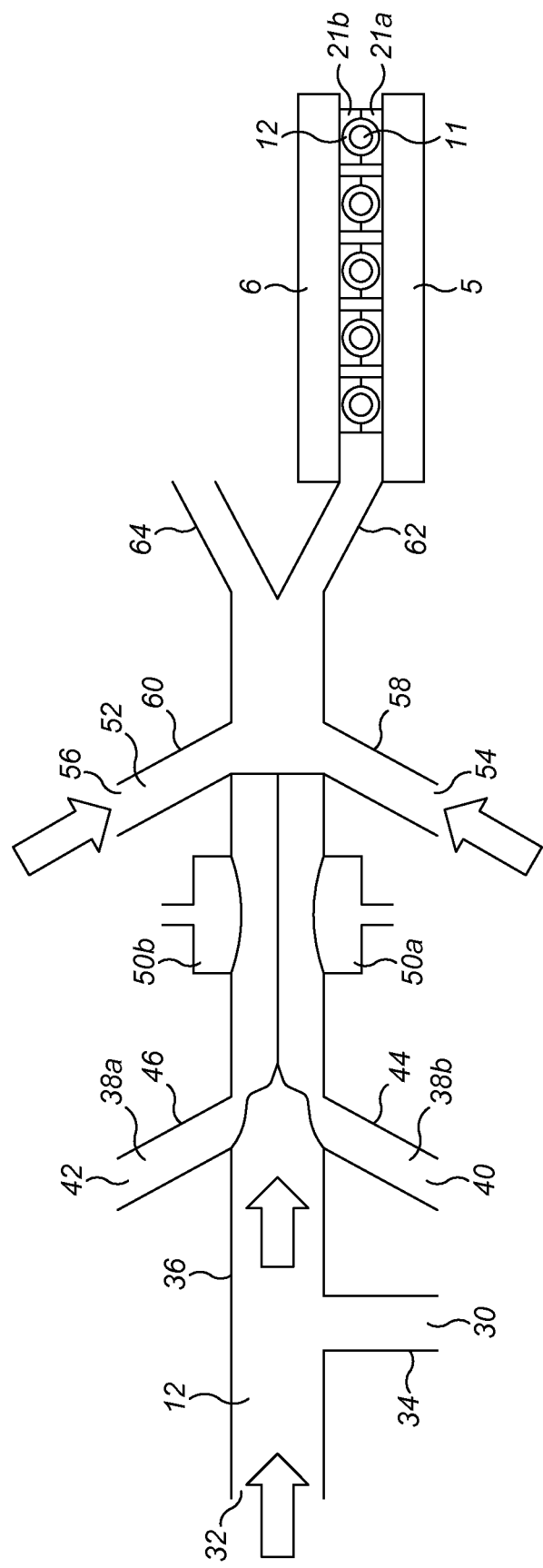

Examples of the method include, after hardening the fluid coating, dispensing a fifth fluid to move the capsule towards and into the space between the first support plate and the second support plate. FIGS. 4e and 4f illustrate schematically such examples. Steps described with reference to FIGS. 4a to 4d are not shown in FIGS. 4e and 4f for clarity, although it will be appreciated that such steps may be occurring while the steps of FIGS. 4e and 4f occur. For example, the microfluidic process may be a continuous process, with the first and second fluids 11, 12 being continuously supplied. In FIG. 4f, one of the capsules 21 is labelled for clarity.

In FIGS. 4e and 4f, the fifth fluid 52 is supplied via fifth and sixth inlets 54, 56 which supply the fifth fluid 52 to fifth and sixth channels 58, 60. In other examples, the fifth fluid may be supplied via one or more than two inlets to one or more than two channels. The fifth fluid 52 flows in a direction towards the capsule, flowing round it and applying pressure to it to transport it towards the first and second support plates 5, 6.

In the examples described with reference to FIGS. 4e and 4f, there are two outlet channels 62, 64 through which the fifth fluid 52 can flow. In these examples, an evaluation system, using for example a T switch, at the intersection between the two outlet channels 62, 64 with an adapted detector may evaluate each incident capsule to assess whether each capsule is suitable for dispensing in the electrowetting device, for example whether the capsule is of an appropriate shape and/or size. The T switch for example comprises an optical sensor with a high-speed camera which in combination with appropriate image analysis software and associated processing circuitry can be used to discriminate between capsules which are suitable for a manufactured electrowetting device and those which are not suitable. The suitable capsules may be chosen based on their fluid dynamic behaviour as they are transported via the fifth fluid 52. Capsules 21 identified as suitable, for example satisfying relevant quality criteria pass through the lower outlet channel 62 and are dispensed between the first and second support plates 5, 6. Capsules which fail to satisfy the required criteria are transported through the upper outlet channel 64 by flow of the fifth fluid 52 and can then be discarded or fixed. Other examples may not include a detector. In these examples, the capsules may be transported directly to between the first and second support plates 5, 6 without first being evaluated for defects.

In examples in which a fifth fluid is dispensed to move the capsule towards the first and second support plates, the fifth fluid is for example immiscible with the capsule. The fifth fluid may be a dielectric insulator. A rate of flow of the fifth fluid may be controlled to control the rate at which the capsules are deposited between the first and second support plates. For example, it may not be desirable to transport the capsules too rapidly as this may cause the capsules to be rotated and positioned between the first and second support plates with an undesired orientation. The fifth fluid may be discarded after it has been used to move the capsule into place. For example, the fifth fluid may continue to flow in the space between the first and second support plates and into an outlet, for example to a drain where it may be discarded or re-used. A filter may be used to prevent the capsules from also escaping via the outlet. In examples, the fifth fluid is compatible with the electrowetting device when manufactured such that the presence of the fifth fluid in the manufactured electrowetting device, for example if some of the fifth fluid remains after draining, does not adversely affect its performance.

The method may include dispensing a plurality of the capsule on a support plate, for example on the first support plate described above, for example between the first support plate and the second support plate. The plurality of capsules may be dispensed according to an electrowetting element array pattern. The electrowetting element array pattern is for example a desired or predetermined arrangement of electrowetting elements within the electrowetting device, which may be regular or irregular, and which may for example be a matrix or grid pattern. The electrowetting element array pattern may be such that each electrowetting element in position according to the pattern aligns with a first electrode such that each electrowetting element overlaps or is above a first electrode. For example, in examples in which the first support plate comprises an array of first electrodes, the method may include dispensing a plurality of capsules between the first support plate and the second support plate according to an electrowetting array pattern such that each capsule of the plurality of capsules is associated with, for example overlapping with and/or laterally aligned with, at least one of the array of first electrodes. For example, each capsule may be dispensed such that it aligns with at least one of the array of first electrodes, such that it is subjected to an electric field when a voltage is applied to the at least one of the array of electrodes. Further, each capsule may be dispensed to form a layer of adjacent capsules on a surface of the support plate, the layer being a single capsule thick. Each capsule of the plurality of capsules may be a solid capsule.

Once the required number of capsules are positioned between the first and second support plates, the first and second support plates may be moved towards each other to compact the capsules. This can improve the contact between the capsules and the support plates. For example, where the capsule comprises an electrically conductive part for contacting the second electrode in the second support plate, pushing the support plates together can force the electrically conductive part of the capsule to touch the second electrode, ensuring adequate electrical contact.

In examples where the first and second support plates comprise polymers, the first and second support plates with the capsules in between, can then be laminated on an electrical support as required, for example to form an electrowetting device such as that described above with respect to the examples of FIGS. 1 and 2.

After the hardening the fluid coating to form the capsule, the first fluid may form a layer of the first fluid on an inner surface of the capsule. For example, where the first fluid and the second fluid are in the form of an emulsion, the emulsion may be unstable over time and the first and second fluids may therefore separate such that there is a layer of the first fluid on the inner surface of the capsule. The second fluid may also form a layer on the layer of the first fluid. The forming of the layer of the first fluid may occur at any time after hardening of the fluid coating. For example, it may occur after the capsules are in place between the first and second support plates or it may occur as the capsules are being transported towards the first and second support plates.

Use of the method according to examples allows electrowetting elements from around 10 to 20 micrometers (μm) (10 to $20 \times 10^{-6}$ meters) in size to be produced. This is smaller than electrowetting elements manufactured using a known method of manufacture. Therefore, the resolution of the electrowetting display including such electrowetting elements is improved compared with the resolution of an electrowetting display manufactured using the known method, in examples. As the first and second fluids, and the fluid coating which is hardened to form the capsule can be applied using a fluid process, this simplifies and reduces the cost of the method of manufacture of electrowetting elements compared to the known method in which a photolithographic process is used to manufacture walls of the element and a fluid process is used to dispense the first and second fluids. Moreover, using an entirely fluidic process, such as in examples described herein, allows the method to be used to prepare flexible electrowetting displays, which cannot be manufactured straightforwardly using known methods. In addition, methods described herein do not have to be performed in a clean room, in contrast to known methods for which a clean room is required. This means that methods according to examples herein are simple and easy to carry out compared with known methods.

In examples, dispensing the fluid coating may include dispensing a third fluid at a first side of the first fluid and the second fluid and dispensing a fourth fluid at a second side of the first fluid and the second fluid. These further examples may also include hardening the third fluid to form a first side of the capsule and hardening the fourth fluid to form a second side of the capsule. In examples, the floating coating may comprise an electrically non-conductive third fluid and an electrically conductive fourth fluid. For example, the fourth fluid may be photolinkable or polymerisable upon exposure to electromagnetic radiation such as ultraviolet radiation.

Referring back to FIG. 4c, this Figure illustrates such examples. In FIG. 4c, the fluid coating dispensed from the second channel 44 as the first stream 38a is the third fluid and the fluid coating dispensed from the third channel 46 as the second stream 38b is the fourth fluid. The third fluid is for example an electrically conductive photoresist and the fourth fluid is for example a hydrophobic photoresist such as a cross-linkable fluoropolymer. The first and second sides of the capsules are as described above with reference to FIGS. 1 and 2.

In further examples, at least part of the capsule is electrically conductive. This may be for example due to its formation at least in part from an electrically conductive fourth fluid, or it may be because the fluid coating is electrically conductive. In these examples, the at least part of the capsule may be electrically conductive due to the addition of a separate electrically conductive component during the method of manufacture.

The methods illustrated using FIGS. 4a to 4f are examples of the use of an apparatus for manufacturing an electrowetting element according to examples. Such an apparatus in examples includes a dispenser configured to dispense a first fluid, a dispenser configured to dispense a second fluid immiscible with the first fluid and a dispenser configured to dispense a fluid coating around the first fluid and the second fluid. Referring back to the examples of FIGS. 4a to 4f, the dispenser for dispensing the first fluid may be for example be a source of the first fluid located at the first inlet 30, which provides first fluid 11 to the first channel 34. For example, the dispenser may be arranged to pump or dose the first fluid at the appropriate rate through the system of FIGS. 4a to 4f. The dispenser may be for example a syringe mechanism, a nozzle, or an outlet, which in examples may be fluidly connected to a fluid pump, for dispensing the desired amount of first fluid 11 in the first channel 34, via the first inlet 30. In other examples the dispenser may be a pipe, tube, channel or conduit. The dispensers of the second fluid and the fluid coating may be similar to the dispenser of the first fluid but configured to provide the second fluid 12 in the second channel 36, via the second inlet 32, and the fluid coating 38 in the third and fourth channels 44, 46, via the third and fourth inlets 40, 42.

In examples, the apparatus includes a hardening system configured to harden the fluid coating to form a capsule containing the first and the second fluid. The hardening system may include a pressure applicator configured to apply pressure to the fluid coating, such as that described above with reference to FIG. 4*d*. In examples, the hardening system includes an electromagnetic radiation source configured to apply electromagnetic radiation to the fluid coating. For example, the electromagnetic radiation may have a wavelength within the range of about 100 to about 380 nanometers, for example within 10% of the upper and lower bound of the range of wavelengths. The electromagnetic radiation may be applied as described above with reference to FIG. 4*d*, and may be applied with or without the application of pressure.

The above examples are to be understood as illustrative examples. Further examples are envisaged.

In the examples described above with reference to FIGS. 1 and 2, the capsule has a first side 21*a* comprising electrically non-conductive material and a second side 21*b* comprising electrically conductive material. In other examples, the capsule may be formed of one material. For example, the capsule may be formed of an electrically non-conductive material. In examples such as this, each electrowetting element may further comprise an electrode electrically connecting the second fluid contained within the capsule with the second electrode in the second support plate.

In further examples, the method according to examples may be used to manufacture a colour electrowetting device comprising colour electrowetting elements. For example, the first fluid described above may be of a first colour for example comprising a dye of the first colour, and the method may further include dispensing a first fluid of a second colour different from the first colour, dispensing the second fluid immiscible with the first fluid of the second colour, for example comprising a dye of the second colour, dispensing a fluid coating around the first fluid of the second colour and the second fluid and hardening the fluid coating around the first fluid of the second colour and the second fluid to form a capsule containing the first fluid of the second colour and the second fluid. The second fluid immiscible with the first fluid of the first and second colours may be dispensed as a continuous stream, for example similar to the stream of the second fluid shown in FIGS. 4*a* to 4*f*. The first fluid of the first colour and the first fluid of the second colour may be supplied from separate dispensers such that the first fluid of the first colour forms a first droplet and the first fluid of the second colour forms a second droplet. The second fluid may then separately surround or encapsulate each of the first droplet and the second droplet. Then the fluid coating may be dispensed such that it also separately surrounds the second fluid encapsulating the first droplet and the second fluid encapsulating the second droplet. Thus, when the first fluid is hardened, two separate capsules are formed, one comprising the first fluid of the first colour and the other comprising the first fluid of the second colour. Such a method may be used to manufacture an electrowetting device with fully colour display capabilities. For example, the method can be used to manufacture separate electrowetting elements for red, green and blue (RGB) or cyan, magenta and yellow (CMY). RGB or CMY elements may be stacked on top of each other to form a multilayer stack display or may be arranged next to each other to form sub-pixels of a pixel.

Further examples relate to a display device comprising an array of electrowetting elements comprising a first support plate comprising an array of first electrodes, a second support plate and a second electrode. Each electrowetting element of the array of electrowetting elements comprises a capsule between the first support plate and the second support plate, the capsule containing a first fluid and a second fluid immiscible with the first fluid, the capsule associated with at least one of the array of first electrodes and the second electrode in electrical contact with the capsule, a configuration of the first and second fluids switchable using a voltage applied between the at least one of the array of first electrodes and the second electrode. The capsule of each electrowetting element may for example be similar to the capsules 21 described above with reference to FIGS. 1 and 2. The display device further comprises at least one processor and at least one memory including computer program instructions, the at least one memory and the computer program instructions configured to, with the at least one processor, control a configuration of the first fluid and the second fluid of each electrowetting element of the array of electrowetting elements using a voltage applied between a respective at least one of the array of first electrodes and the second electrode. Such a display device may be an electrowetting display device or an electrowetting lens for example. In examples, the capsule is a solid capsule, for example such as a solid capsule 21 described above with reference to FIG. 1.

Figure 5:
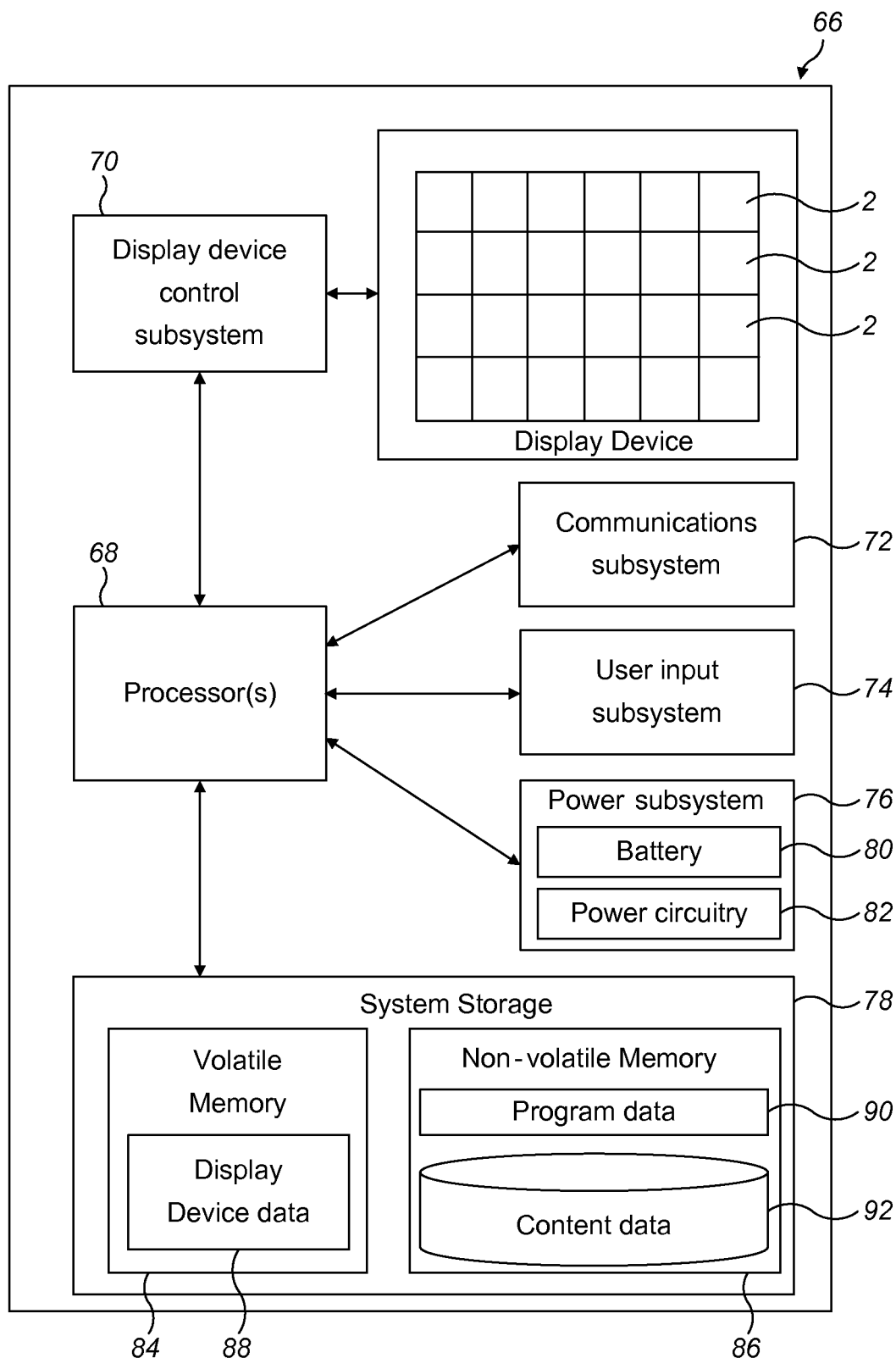
FIG. 5 shows a schematic system diagram of an apparatus including an electrowetting display device according to examples.

FIG. 5 shows schematically a system diagram of such a display device according to examples, for example apparatus 66, comprising an electrowetting display device such as the electrowetting display device 1 described above comprising electrowetting display elements 2. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 66. The apparatus includes at least one processor 68 connected to and therefore in data communication with for example: a display device control subsystem 70, a communications subsystem 72, a user input subsystem 74, a power subsystem 76 and system storage 78. The display device control subsystem is connected to and is therefore in data communication with the display device 1. The at least one processor 68 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 78. The at least one processor may additionally, or in the alternative, contain memory, such as processor registers.

The display device control subsystem 70 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 72 for example is configured for the apparatus to communicate with for example a computing device via a data network, for example a computer network such as the Internet, a local area network, a wide area network, a telecommunications network, a wired network, a wireless network, or some other type of network. The communications subsystem 72 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 74 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 76 for example includes power circuitry 82 for use in transferring and controlling power consumed by the apparatus. The power may be provided by a mains electricity supply or from a battery 80, via the power circuitry. The power circuitry may further be used for charging the battery from a mains electricity supply.

The system storage 78 includes at least one memory, for example at least one of volatile memory 84 and non-volatile memory 86 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect provided by the electrowetting display device.

In examples in accordance with FIG. 5, the volatile memory 84 stores for example display device data 88 which is indicative of display effects to be provided by the display device 1. The processor 68 may transmit data, based on the display device data, to the display device control subsystem 70 which in turn outputs signals to the display device for applying voltages to the display elements, for providing display effects from the display device. The non-volatile memory 86 stores for example program data 90 and/or content data 92. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

In the display device 1 of the examples described with respect to FIG. 5, the capsule of each electrowetting element of the array of electrowetting elements may comprise a first side comprising an electrically non-conductive material and a second side comprising an electrically conductive material. The first side of the capsule of each electrowetting element of the array of electrowetting elements may be between the first support plate and the first fluid, and the second side of the capsule of each electrowetting element of the array of electrowetting elements may be between the second support plate and the second fluid, and in electrical contact with the second electrode and the second fluid in such examples.

In further examples of the display device 1 in accordance with FIG. 5, each capsule of the array of electrowetting elements comprises a first side comprising a material more wettable to the first fluid than to the second fluid.

In the examples above, the first side and second sides may be similar to or the same as the first and second sides 21a, 21b described above with reference to FIGS. 1 and 2.

The display device 1 may include a first electrowetting element of the array of electrowetting elements comprising a capsule containing a first fluid of a first colour and a second electrowetting element of the array of electrowetting elements comprising a capsule containing a first fluid of a second colour in examples. Such a display device 1 may be manufactured using the example method described above, in which first fluid of first and second colours is dispensed, surrounded by the second fluid and fluid coating is hardened around the second fluid to form two capsules: one containing first fluid of the first colour and one containing first fluid of the second colour.

In further examples, it is to be appreciated that an alternative hardening technique may be used to form the capsule from the fluid coating. For example, in addition to, or as an alternative to, hardening of the fluid coating using electromagnetic radiation, at least one of the following may be used for the hardening of the fluid coating to form the capsule: temperature treatment such as heating or cooling, a polymerisation reaction of the fluid coating material, or a chemical reaction to cross-link molecules of the fluid coating.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

Further examples are described in accordance with the following numbered clauses:

1. An apparatus for manufacturing an electrowetting element, comprising:
   a dispenser configured to dispense a first fluid;
   a dispenser configured to dispense a second fluid immiscible with the first fluid;
   a dispenser configured to dispense a fluid coating around the first fluid and the second fluid; and
   a hardening system configured to harden the fluid coating to form a capsule containing the first and the second fluid.

2. An apparatus according to clause 1, wherein the hardening system comprises a pressure applicator configured to apply pressure to the fluid coating.

3. An apparatus according to clause 1, wherein the hardening system comprises a radiation source configured to apply radiation to the fluid coating.

4. An apparatus according to clause 3, wherein the radiation has a wavelength within the range of about 100 to about 380 nanometers.

5. A method of manufacturing an electrowetting display device, the method comprising:
   dispensing a plurality of capsules on a support plate comprising an array of first electrodes according to an electrowetting element array pattern, each capsule of the plurality of capsules containing a first fluid and a second fluid immiscible with the first fluid.

6. A method according to clause 5, wherein each capsule of the plurality of capsules is a solid capsule.

What is claimed is:

1. A method of manufacturing an electrowetting device comprising:
   dispensing a first fluid;
   dispensing a second fluid immiscible with the first fluid;
   dispensing a fluid coating around the first fluid and the second fluid, the dispensing the fluid coating around the first fluid and the second fluid comprising:
      dispensing a third fluid at a first side of the first fluid and the second fluid, the third fluid comprising an electrically non-conductive fluid; and
      dispensing a fourth fluid at a second side of the first fluid and the second fluid, the fourth fluid comprising an electrically conductive fluid; and
   hardening the fluid coating to form a capsule containing the first fluid and the second fluid the hardening the fluid coating comprising:
      hardening the third fluid to form a first side of the capsule; and
      hardening the fourth fluid to form a second side of the capsule.

2. The method of manufacturing an electrowetting device according to claim 1, wherein the dispensing the first fluid comprises dispensing the first fluid into the second fluid to form at least one of:
   an emulsion of the first fluid dispersed in the second fluid; or
   a droplet of the first fluid within the second fluid.

3. The method of manufacturing an electrowetting device according to claim 1,
   the dispensing the fluid coating comprising:
      dispensing a first stream of the fluid coating; and
      dispensing a second stream of the fluid coating towards the first stream of the fluid coating,
   the dispensing the first fluid comprising dispensing the first fluid between the first stream of the fluid coating and the second stream of the fluid coating; and
   the dispensing the second fluid comprising dispensing the second fluid between the first stream of the fluid coating and the second stream of the fluid coating.

4. The method of manufacturing an electrowetting device according to claim 1,
   the dispensing the fluid coating comprising:
      dispensing a first stream of the fluid coating in a first direction; and
      dispensing a second stream of the fluid coating in a second direction towards the first stream of the first fluid and substantially opposing the first direction;
   the dispensing the first fluid comprising dispensing a stream of the first fluid into a stream of the second fluid to disperse the first fluid in the second fluid; and
   the dispensing the second fluid comprising dispensing a stream of the second fluid, with the first fluid dispersed in the second fluid, into a region of the fluid coating where the first stream of the fluid coating meets the second stream of the fluid coating.

5. The method of manufacturing an electrowetting device according to claim 4, wherein the dispensing the second fluid comprises dispensing the stream of the second fluid, with the first fluid dispersed in the second fluid, in a direction substantially perpendicular to the first direction and the second direction.

6. The method of manufacturing an electrowetting device according to claim 1, wherein the hardening the fluid coating comprises:
   applying electromagnetic radiation with a wavelength of between about 100 nanometers to about 380 nanometers to the fluid coating.

7. The method of manufacturing an electrowetting device according to claim 1, comprising applying pressure to the fluid coating during the hardening the fluid coating.

8. The method of manufacturing an electrowetting device according to claim 1, comprising:
after the hardening the fluid coating, dispensing a fifth fluid to transfer the capsule towards and into a space between a first support plate and a second support plate.

9. The method of manufacturing an electrowetting device according to claim 1, comprising:
dispensing a plurality of the capsule between a first support plate and a second support plate according to an electrowetting element array pattern.

10. The method of manufacturing an electrowetting device according to claim 1, wherein at least part of the capsule is electrically conductive.

11. The method of manufacturing an electrowetting device according to claim 1,
the dispensing the first fluid comprising dispensing a first colour first fluid immiscible with the second fluid;
the dispensing the fluid coating comprising dispensing the fluid coating around the first colour first fluid and the second fluid; and
the hardening the fluid coating comprising hardening the fluid coating around the first colour first fluid and the second fluid to form the capsule, the capsule being a first capsule,
the method further comprising:
dispensing a second colour first fluid immiscible with the second fluid;
dispensing the fluid coating around the second colour first fluid and the second fluid; and
hardening the fluid coating around the second colour first fluid and the second fluid to form a second capsule containing the second colour first fluid and the second fluid.

12. The method of manufacturing an electrowetting device according to claim 1, wherein the first fluid is electrically non-conductive and the second fluid is at least one of: electrically conductive or polar.

13. The method of manufacturing an electrowetting device according to claim 12, wherein
the first fluid comprises at least one of: an alkane, decane, hexadecane, a silicone oil, hexamethyldisiloxane, or decalin, and
the second fluid comprises at least one of: water, a polyether; a peroxide; a polyol, a diol, a triol, a tetraol; an ether; dioxalane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; glutaric acid; a tricarboxylic acid; citric acid; aconitic acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; ethylene glycol; polyethylene glycol; propylene glycol; erythritol; glycerol; butanetriol; derivatives thereof; or any combinations thereof.

14. The method of manufacturing an electrowetting device according to claim 1, comprising:
after the hardening the fluid coating, transferring the capsule towards and into a space between a first support plate and a second support plate, the first side of the capsule comprising an electrically non-conductive material between the first support plate and the first fluid, and the second side of the capsule comprising an electrically conductive material between the second support plate and the second fluid.

15. The method of manufacturing an electrowetting device according to claim 14, wherein the first fluid is electrically non-conductive and the second fluid is at least one of: electrically conductive or polar.

16. The method of manufacturing an electrowetting device according to claim 14, wherein the transferring the capsule comprises transferring the capsule into the space between the first support plate and the second support plate such that the first side of the capsule is between a first electrode of the first support plate and the first fluid.

17. The method of manufacturing an electrowetting device according to claim 14, wherein the transferring the capsule comprises transferring the capsule into the space between the first support plate and the second support plate such that the second side of the capsule is in electrical contact with a second electrode.

18. The method of manufacturing an electrowetting device according to claim 14, wherein the transferring the capsule comprises transferring the capsule into the space between the first support plate and the second support plate to form an electrowetting element comprising the capsule.

19. The method of manufacturing an electrowetting device according to claim 14, wherein the second side of the capsule comprises an electrically conductive photoresist material.

20. The method of manufacturing an electrowetting device according to claim 1, wherein the first side of the capsule comprises a material more wettable to the first fluid than to the second fluid.

21. The method of manufacturing an electrowetting device according to claim 1, wherein the capsule has a substantially cuboid shape.

22. The method of manufacturing an electrowetting device according to claim 1, wherein the third fluid comprises an electrically conductive photoresist.

23. The method of manufacturing an electrowetting device according to claim 1, wherein the fourth fluid comprises a hydrophobic photoresist.

* * * * *